United States Patent
Lee

(10) Patent No.: US 8,004,608 B2
(45) Date of Patent: Aug. 23, 2011

(54) CLOSED CAPTIONING DATA DETECTION SYSTEM AND METHOD

(75) Inventor: Janghwan Lee, Pleasanton, CA (US)

(73) Assignee: Shenzhen TCL New Technology Ltd, Shenzhen, Guangdong (CN)

( * ) Notice: Subject to any disclaimer, the term of this patent is extended or adjusted under 35 U.S.C. 154(b) by 1111 days.

(21) Appl. No.: 11/811,310

(22) Filed: Jun. 7, 2007

(65) Prior Publication Data

US 2007/0285566 A1    Dec. 13, 2007

Related U.S. Application Data

(60) Provisional application No. 60/811,891, filed on Jun. 8, 2006.

(51) Int. Cl.
*H04N 7/08* (2006.01)
*H04N 7/18* (2006.01)

(52) U.S. Cl. ........ 348/465; 348/468; 348/461; 348/473; 348/569

(58) Field of Classification Search ............... 348/465, 348/468, 461, 473, 478, 476, 569, 563, 564, 348/553, 714, 715; 725/40, 136, 137

See application file for complete search history.

(56) References Cited

U.S. PATENT DOCUMENTS

| | | |
|---|---|---|
| 5,699,124 A | 12/1997 | Nuber et al. |
| 5,917,559 A | 6/1999 | Um |
| 6,097,439 A | 8/2000 | Goldberg |
| 6,348,951 B1 | 2/2002 | Kim |
| 6,373,526 B1 | 4/2002 | Kessler et al. |
| 6,961,382 B1 | 11/2005 | Yu et al. |

(Continued)

FOREIGN PATENT DOCUMENTS

JP    2000115787 A    4/2000

(Continued)

OTHER PUBLICATIONS

Author Unknown, VBI Bridging of Closed Caption Data, EVERTZ, Application Note #2, Publication Date Jun. 26, 2001, Rev. 1, pp. AN2-1 thru AN2-6.

*Primary Examiner* — M. Lee
*Assistant Examiner* — Jean W Désir
(74) *Attorney, Agent, or Firm* — Fletcher Yoder

(57) ABSTRACT

An exemplary method relates to buffering closed captioning data. The exemplary method comprises receiving closed captioning information comprising closed captioning data and a field, determining whether a current closed captioning data buffer is available for the field, saving the closed captioning data to the current closed captioning data buffer if the current closed captioning data buffer is available for the field, determining whether a next closed captioning data buffer is available for the field if the current closed captioning data buffer is not available, saving the closed captioning data to the next closed captioning data buffer if the next closed captioning data buffer is available for the field, checking whether the closed captioning data can be ignored if the next closed captioning data is not available for the field, dropping the closed captioning data if the closed captioning data can be ignored, checking whether there is room for an additional closed captioning data buffer if the closed captioning data cannot be ignored, saving the closed captioning data to the additional closed captioning data buffer if the there is room for the additional closed captioning data buffer, and dropping the closed captioning data if there is no room for the additional closed captioning data buffer.

20 Claims, 4 Drawing Sheets

U.S. PATENT DOCUMENTS

| | | | |
|---|---|---|---|
| 7,071,993 B2 * | 7/2006 | Kim | 348/465 |
| 7,161,631 B2 * | 1/2007 | Katayama et al. | 348/468 |
| 7,339,992 B2 * | 3/2008 | Chang et al. | 375/240.25 |
| 7,391,470 B2 * | 6/2008 | Kim | 348/465 |
| 7,502,072 B2 * | 3/2009 | Onomatsu et al. | 348/468 |
| 2005/0162551 A1 | 7/2005 | Baker | |
| 2006/0130117 A1 | 6/2006 | Lee et al. | |
| 2007/0022461 A1 | 1/2007 | Lee | |

FOREIGN PATENT DOCUMENTS

| | | |
|---|---|---|
| JP | 2004080825 A | 3/2004 |

* cited by examiner

CLOSED CAPTIONING DATA DETECTION SYSTEM AND METHOD

CROSS REFERENCE TO RELATED APPLICATION

This application claims priority based on U.S. Provisional Application Ser. No. 60/811,891 filed on Jun. 8, 2006, which is incorporated by reference as though completely set forth herein.

BACKGROUND

This section is intended to introduce the reader to various aspects of art which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

It is known to put user data into a digital television (TV) data stream. It is also known that closed captioning data may be obtained from user data. An improved method of processing closed captioning data in the form of user data is desirable.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In an exemplary embodiment of the present invention, when a video decoder finds a user data from a header, to find all user data in that header, the decoder checks the user data buffer and finds possibly an additional second and/or third item of user data.

Figure 1:
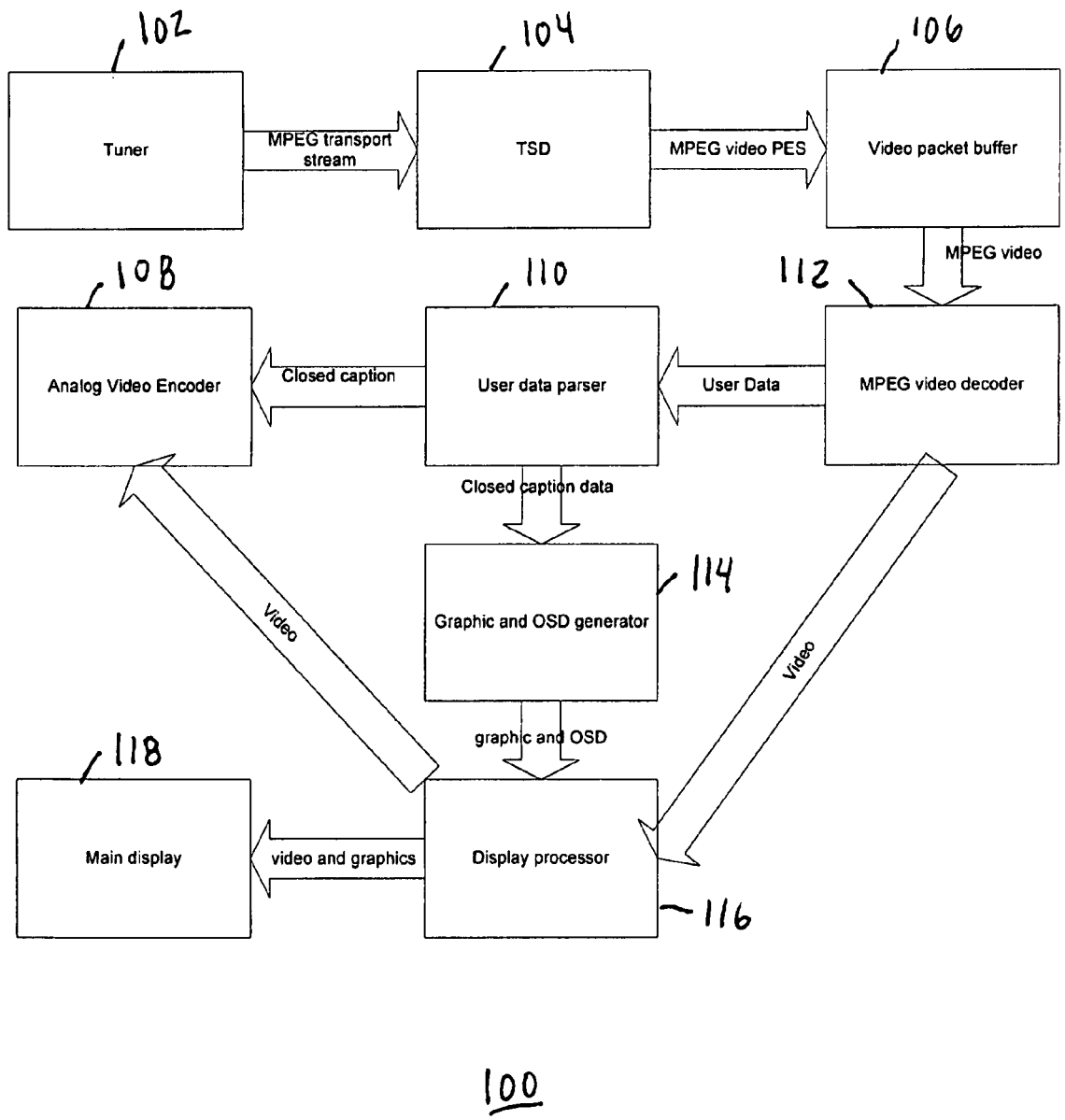
FIG. 1 is a block diagram of an electronic device that may employ an exemplary embodiment of the present invention.

FIG. 1 shows a system block diagram of an electronic device 100 that is adapted to decode closed captioning data from digital input and to insert for that data into an analog video output in accordance with an exemplary embodiment of the present invention. Those of ordinary skill in the art will appreciate that the various functional blocks shown in FIG. 1 may comprise hardware elements (including circuitry), software elements (including computer code stored on a machine-readable medium) or a combination of both hardware and software elements.

A tuner block 102 tunes to selected frequency and delivers an MPEG transport stream to a transport stream demultiplexer (TSD) block 104, which de-multiplexes the MPEG transport digital stream into video data, audio data and other data (form example, a PES (packet element stream)). The video data and PES data is delivered to a video packet buffer 106. An MPEG video decoder 112 is used to decode the video data and to deliver the decoded video data to a display processor 116.

The MPEG video decoder 112 delivers the PES data, which it separated from the MPEG video data when decoding the video data, to a user data parser block 110. The PES data may comprise closed captioning data in the form of user data. The closed captioning data may be extracted by the user data parser block 110. The user data parser delivers the extracted closed captioning data to an analog video encoder block 108 and a graphic and on-screen display (OSD) generator block 114. The graphic and OSD generator block 114 delivers graphic and OSD data to the display generator 116. The display processor 116, which also receives decoded MPEG video data from the MPEG video decoder block 112, combines the graphic and OSD data with the MPEG video data into a digital display signal for display on a main display 118. In addition, the display processor 116 delivers video data to the analog video encoder 108.

The analog video encoder block 108 combines the closed captioning data with the video data received from the display processor 116 and makes a combined analog output signal available. In an exemplary embodiment of the present invention, the analog video encoder block 108 generates NTSC (or PAL) video with decoded video and closed captioning data on a vertical blanking interval (VBI). For film mode support, a buffer adapted to hold data corresponding to a frame after next may be used because iteration of the same data at two consecutive frames in the same field may be needed.

The format for closed captioning data in user data is defined in industry standards such as the Advanced Television Systems Committee (ATSC) standard ATSC 53 and the Electronic Industries Alliance (EIA) standard EIA708. Some formats include EIA608 closed captioning data. In an exemplary embodiment of the present invention, the closed captioning data delivered to the analog video encoder 108 comprises EIA608 closed captioning data.

Figure 2:
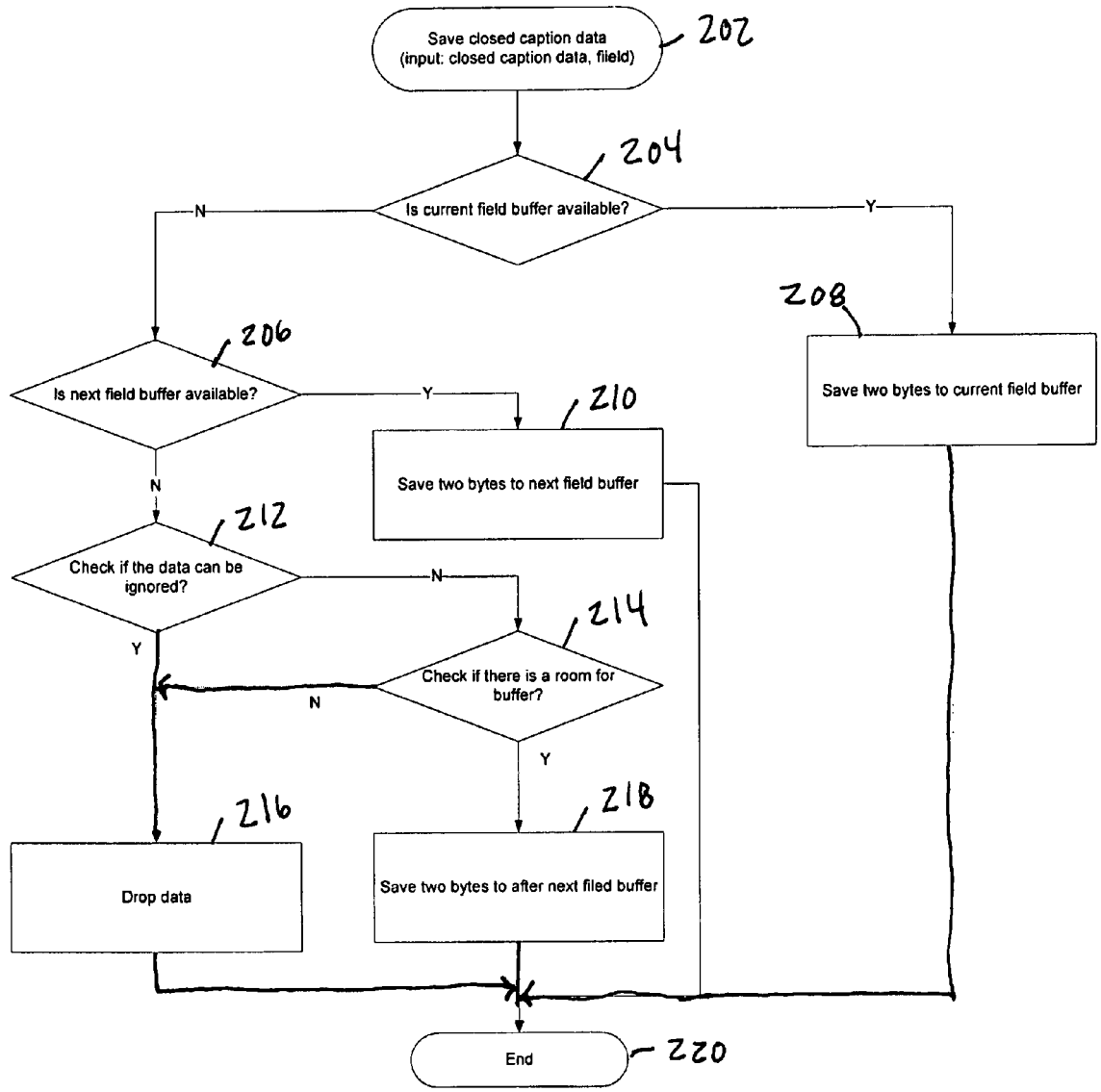
FIG. 2 is a process flow diagram showing a closed captioning mode selection process with multiple user data in accordance with an exemplary embodiment of the present invention.

FIG. 2 is a process flow diagram showing a closed captioning mode selection process with multiple user data in accordance with an exemplary embodiment of the present invention. The process shown in FIG. 2 is generally represented by the reference number 200. In an exemplary embodiment of the present invention, the user data parser block 110 (FIG. 1) may be adapted to perform the process 200.

In the process 200, a comparison of data in a buffer is made with a user data start code until there is no user data start code in the buffer. The user data structure is defined on each application standard, such as the closed captioning data structure defined in ATSC 53. By knowing the user data structure, the process 200 can identify the next user data start code easily.

The process shown in FIG. 2 shows an example of a case of multiple user data extraction. In this exemplary case, closed captioning data comprises user data and more than one closed captioning user data packet is expected in a picture header. At a block 202, closed captioning data is saved. The received closed captioning data comprises the data itself and an associated field. At a decision block 204, it is determined whether a current field buffer is available. If a current field buffer is available, two bytes of user data is stored to the current field buffer at block 208 and the process ends at block 220.

If no current field buffer is available at block 204, a determination is made regarding whether a next field buffer is available at block 206. If a next field buffer is available at block 206, two bytes of closed captioning data are stored to the next field buffer at block 210. After the data is stored at block 210, the process ends at block 220.

If no next field buffer is available at block 206, a determination is made whether the data can be ignored at block 212. If the data can be ignored, it is dropped at block 216 and the process ends at block 220.

If the data cannot be ignored at block 212, a determination is made as to whether there is room for an additional buffer at block 214. If there is no room for an additional buffer, the data is dropped at block 216 and the process ends at block 220. If there is room for an additional buffer at block 214, two bytes of data are saved to a new after next field buffer at block 218 and the process ends at block 220.

Figure 3:
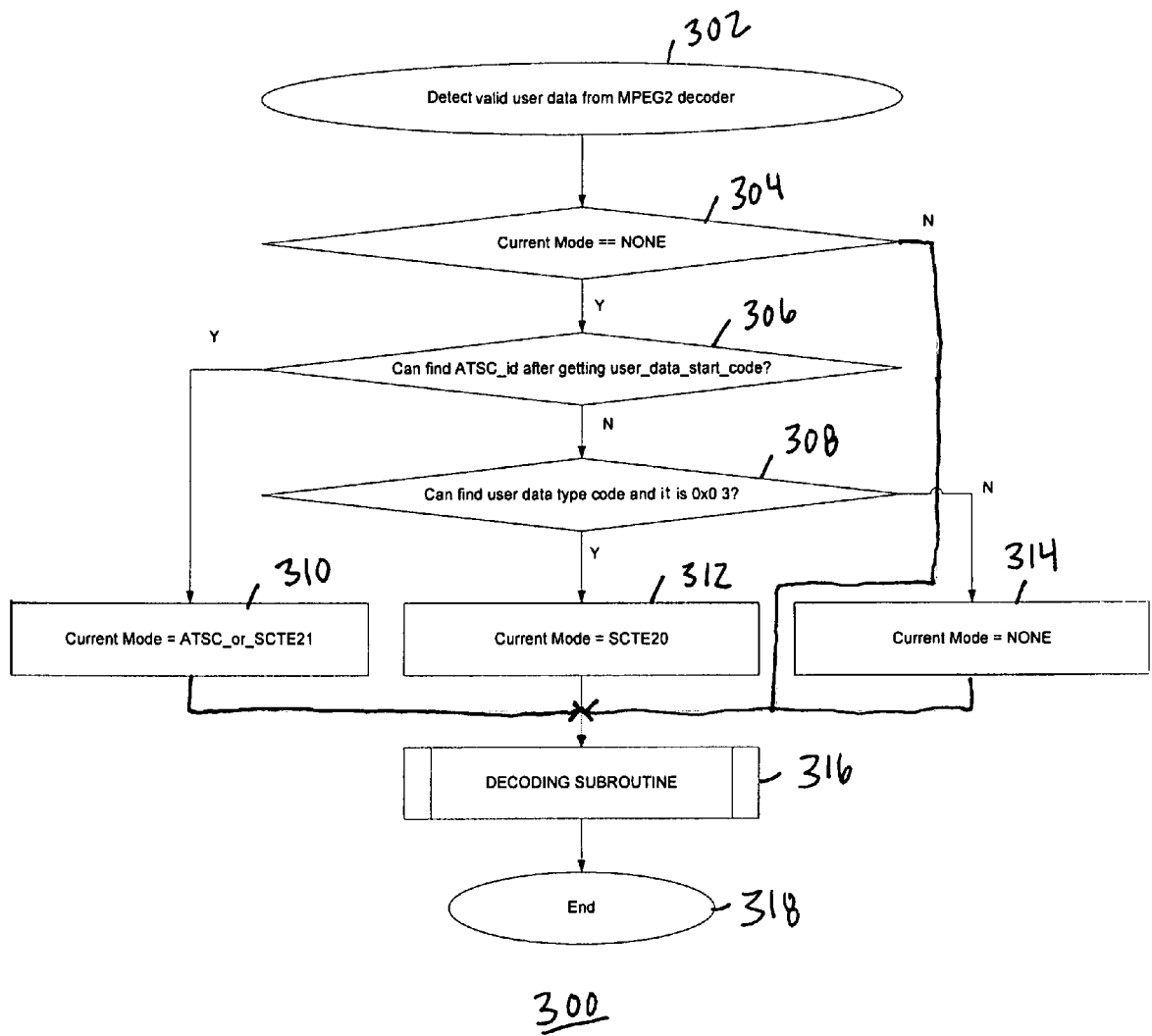
FIG. 3 is a process flow diagram showing a closed captioning data decoding process in accordance with an exemplary embodiment of the present invention.
Figure 4:
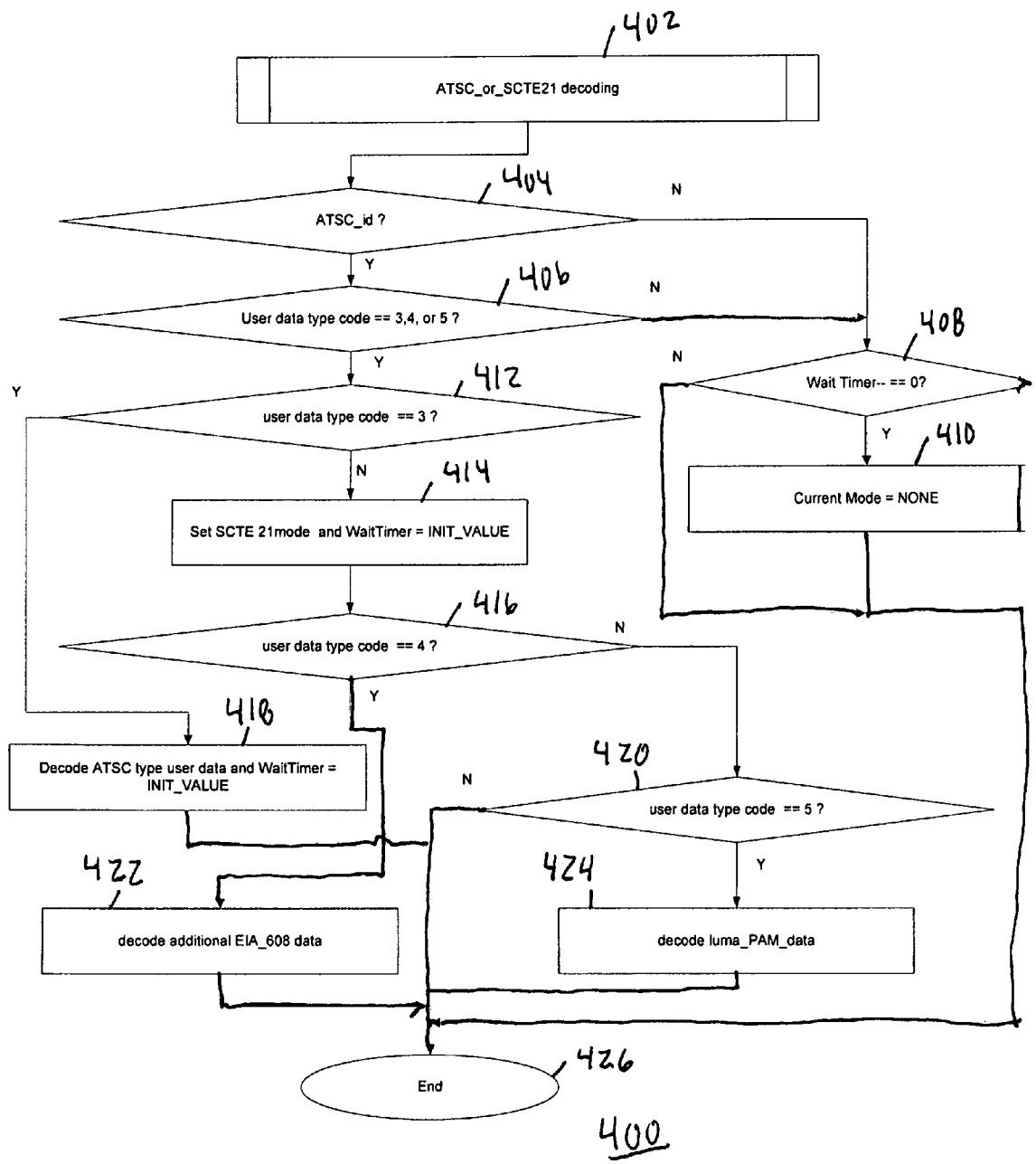
FIG. 4 is a process flow diagram showing a closed captioning data decoding routine for Advanced Television Systems Committee (ATSC) and Society of Cable Telecommunications Engineers (SCTE) SCTE21 closed captioning data in accordance with an exemplary embodiment of the present invention.

FIG. 3 and FIG. 4 show subroutines that may be used in conjunction with the exemplary process shown in FIG. 2. In the exemplary embodiment shown in FIG. 3 and FIG. 4, a timer is used to switch to another closed captioning mode, so unneeded mode switching is prevented. A flag may be added to check only once within a header for the same kind of user data. For instance, it is not necessary to check multiple SCTE20, SCTE21 and ATSC closed captioning user data in a picture header, so a flag to check whether it already detected a particular type of user data can be added.

FIG. 3 is a process flow diagram showing a closed captioning data decoding process in accordance with an exemplary embodiment of the present invention. The process, which is generally referred to by the reference number 300, determines a current decoding mode of operation based on the format of closed captioning data that is currently being decoded. At block 302, valid user data is detected by an MPEG decoder. At block 304, a determination is made about a current mode of operation.

If the current mode is not "none," control is passed to a decoding subroutine at block 316 and the process ends at block 318.

If the current mode is other than "none" at block 304, a determination is made about whether an ATSC_id can be found after getting a user_data_start_code at block 306. If the ATSC_id is found at block 306 the current mode is determined to be ATSC_or_SCTE21 at block 310. Process flow then proceeds to the decoding subroutine at block 316 and the process ends at block 318.

If no ATSC_id is found at block 306, a determination is made about whether a user data type code of a predetermined value (for example, 0x0 3) can be found at block 308. If the predetermined user data type code is not found at block 308, the current mode of operation is set to "none" at block 314 and process flow continues to the decoding subroutine 316. Thereafter, the process ends at block 318.

If the predetermined user data type code is found at block 308, the current operating mode is set to SCTE20 at block 312. Process flow then proceeds to the decoding subroutine at block 316 and the process ends at block 318.

FIG. 4 is a process flow diagram showing a closed captioning data decoding routine for ATSC and SCTE21 in accordance with an exemplary embodiment of the present invention. The process is generally referred to by the reference number 400. The process 400 may be useful if the mode of operation of the decoder is ATSC_or_SCTE21 (see FIG. 3, block 310), as shown at block 402.

At block 404, a determination is made as to whether an ATSC_id is present. If no ATSC_id is present, a determination is made about whether a wait timer has expired at block 408. If the wait timer has not expired, the current mode of operation is kept and the process ends at block 426. If the wait timer has expired at block 408, the current mode of operation is set to "none" at block 410 and the process ends at block 426.

If an ATSC_id is present at block 404, a determination is made about whether the data includes a predetermined user data type code or group of user data type codes. In the exemplary embodiment shown in FIG. 4, the predetermined user data type code(s) that are searched for are 3, 4 or 5. If the data does not include a user data type code corresponding to 3, 4 or 5 at block 406, a determination is made about whether a wait timer has expired at block 408. If the wait timer has not expired, the current mode of operation is kept and the process ends at block 426. If the wait timer has expired at block 408, the current mode of operation is set to "none" at block 410 and the process ends at block 426.

If the predetermined user data type code is identified at block 406, processing continues based on the specific value of the user data type code. A determination is made about whether the user data type code is 3 at block 412. If the user data type code is determined to be 3 at block 412, process flow continues to block 418 where a decode ATSC type user data flag is initialized, along with the wait timer. The process then ends at block 426.

If the predetermined value of the user data type code is not 3 at block 412, the decoding mode of operation is set to SCTE21 and the wait timer is initialized at block 414. Process flow then proceeds to block 416, where a determination is made about whether the value of the predetermined user data type code is 4. If the predetermined user data type code is determined to be 4 at block 416, additional EIA_608 data is decoded at block 422 and the process ends at block 426.

If the predetermined value of the user data type code is not 4 at block 416, then a determination is made about whether the value of the user data type code is 5 at block 420. If the value of the user data type code is not 5 at block 420, the process ends at block 426. If the value of the user data type code is determined to be 5 at block 420, a decode operation is performed on luma_PAM_data at block 424. The process subsequently ends at block 426.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of buffering closed captioning data, comprising:

receiving closed captioning information comprising closed captioning data and a field;

determining whether a current closed captioning data buffer is available for the field;

saving the closed captioning data to the current closed captioning data buffer if the current closed captioning data buffer is available for the field;

determining whether a next closed captioning data buffer is available for the field if the current closed captioning data buffer is not available;

saving the closed captioning data to the next closed captioning data buffer if the next closed captioning data buffer is available for the field;

checking whether the closed captioning data can be ignored if the next closed captioning data is not available for the field;

dropping the closed captioning data if the closed captioning data can be ignored;

checking whether there is room for an additional closed captioning data buffer if the closed captioning data cannot be ignored;

saving the closed captioning data to the additional closed captioning data buffer if the there is room for the additional closed captioning data buffer; and dropping the closed captioning data if there is no room for the additional closed captioning data buffer.

2. The method recited in claim 1, comprising determining a format of the closed captioning data.

3. The method recited in claim 1, comprising determining that the closed captioning data conforms to an ATSC standard or a SCTE21 standard.

4. The method recited in claim 3, comprising decoding the closed captioning data.

5. The method recited in claim 1, comprising determining that the closed captioning data conforms to a SCTE20 standard.

6. The method recited in claim 5, comprising identifying a user data type code.

7. The method recited in claim 5, comprising decoding the closed captioning data.

8. The method recited in claim 1, comprising combining the closed captioning data with video data into an analog output signal.

9. The method recited in claim 1, comprising combining the closed captioning data with video data into a digital output signal.

10. An electronic device, comprising:
a tuner that is adapted to receive a video signal that comprises closed captioning data;
a video decoder that is adapted to receive data corresponding to the video signal and to decode the data into video data and user data, the user data comprising the closed captioning data; and
a user data parser that is adapted to:
receive closed captioning information comprising the closed captioning data and a field;
determine whether a current closed captioning data buffer is available for the field;
save the closed captioning data to the current closed captioning data buffer if the current closed captioning data buffer is available for the field;
determine whether a next closed captioning data buffer is available for the field if the current closed captioning data buffer is not available;
save the closed captioning data to the next closed captioning data buffer if the next closed captioning data buffer is available for the field;
check whether the closed captioning data can be ignored if the next closed captioning data is not available for the field;
drop the closed captioning data if the closed captioning data can be ignored;
check whether there is room for an additional closed captioning data buffer if the closed captioning data cannot be ignored;
save the closed captioning data to the additional closed captioning data buffer if the there is room for the additional closed captioning data buffer; and
drop the closed captioning data if there is no room for the additional closed captioning data buffer.

11. The electronic device recited in claim 10, wherein the user data parser is adapted to determine a format of the closed captioning data.

12. The electronic device recited in claim 10, wherein the user data parser is adapted to determine whether the closed captioning data conforms to an ATSC standard or a SCTE21 standard.

13. The electronic device recited in claim 12, wherein the user data parser is adapted to decode the closed captioning data.

14. The electronic device recited in claim 10, wherein the user data parser is adapted to determine whether the closed captioning data conforms to a SCTE20 standard.

15. The electronic device recited in claim 14, wherein the user data parser is adapted to identify a user data type code.

16. The electronic device recited in claim 14, wherein the user data parser is adapted to decode the closed captioning data.

17. The electronic device recited in claim 10, comprising an analog video encoder that is adapted to combine the closed captioning data with video data into an analog output signal.

18. The electronic device recited in claim 10, comprising a display processor that is adapted to combine the closed captioning data with video data into a digital output signal.

19. An electronic device, comprising:
means for receiving closed captioning information comprising closed captioning data and a field;
means for determining whether a current closed captioning data buffer is available for the field;
means for saving the closed captioning data to the current closed captioning data buffer if the current closed captioning data buffer is available for the field;
means for determining whether a next closed captioning data buffer is available for the field if the current closed captioning data buffer is not available;
means for saving the closed captioning data to the next closed captioning data buffer if the next closed captioning data buffer is available for the field;
means for checking whether the closed captioning data can be ignored if the next closed captioning data is not available for the field;
means for dropping the closed captioning data if the closed captioning data can be ignored;
means for checking whether there is room for an additional closed captioning data buffer if the closed captioning data cannot be ignored;
saving the closed captioning data to the additional closed captioning data buffer if the there is room for the additional closed captioning data buffer; and
means for dropping the closed captioning data if there is no room for the additional closed captioning data buffer.

20. The electronic device recited in claim 19, comprising means for determining a format of the closed captioning data.

* * * * *